(12) United States Patent
Sacripante et al.

(10) Patent No.: US 6,235,395 B1
(45) Date of Patent: May 22, 2001

(54) FLEXIBLE DISPLAYS COMPRISING SPHERES ENCAPSULATED WITHIN A WAX

(75) Inventors: Guerino G. Sacripante, Oakville (CA); James C. Mikkelsen, Jr., Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/035,518

(22) Filed: Mar. 5, 1998

(51) Int. Cl.⁷ .................................. B32B 5/16; G09G 3/20
(52) U.S. Cl. ......................... 428/403; 345/55; 345/107; 428/404; 428/406; 428/407; 428/484
(58) Field of Search .................................. 428/323, 403, 428/407, 484, 404, 406; 345/55, 107

(56) References Cited

U.S. PATENT DOCUMENTS

| | | | |
|---|---|---|---|
| 4,126,854 | 11/1978 | Sheridon | 340/373 |
| 4,143,103 | 3/1979 | Sheridon | 264/4 |
| 4,261,653 | 4/1981 | Goodrich | 350/362 |
| 4,438,160 | 3/1984 | Ishikawa et al. | 427/214 |
| 4,693,560 * | 9/1987 | Wiley | 350/335 |
| 4,764,317 * | 8/1988 | Anderson et al. | 264/4 |
| 4,832,458 * | 5/1989 | Fergason et al. | 350/338 |
| 5,389,945 | 2/1995 | Sheridon | 345/85 |
| 5,708,525 * | 1/1998 | Sheridon | 359/296 |
| 5,739,946 * | 4/1998 | Iwanaga et al. | 359/296 |
| 5,894,367 * | 4/1999 | Sheridon | 359/623 |
| 5,976,428 * | 11/1999 | Richley | 264/10 |
| 5,982,346 * | 11/1999 | Sheridon et al. | 345/85 |
| 5,989,629 * | 11/1999 | Sacripante et al. | 427/180 |
| 6,017,584 * | 1/2000 | Albert et al. | 427/213.3 |

OTHER PUBLICATIONS

Chemical Dictionary, Fifth Edition, Grant & Hackh's, pp. 118, 407, 531, and 628, 1987.*
Webster's Collegiate Dictionary, Tenth Edition, Merriam–Webster, p. 1337, 1998.*

* cited by examiner

*Primary Examiner*—H. Thi Le
(74) *Attorney, Agent, or Firm*—E. O. Palazzo

(57) ABSTRACT

A display comprised of a first component containing spheres encapsulated within a wax, and thereover and thereunder said component substrates.

26 Claims, No Drawings

FLEXIBLE DISPLAYS COMPRISING SPHERES ENCAPSULATED WITHIN A WAX

RELATED PATENT

Illustrated in U.S. Pat. No. 5,989,629, the disclosure of which is totally incorporated herein by reference, is a process for the preparation of bichromal spheres comprising (I) preparing monochromal spheres by the aggregation and coalescence of an emulsion resin with a first colorant and an inorganic salt; (ii) contacting the resulting monochromal spheres with an oxidizing agent, followed by a polymerization with a vinyl monomer and a free radical initiator; (iii) forming a of the resulting monochromal spheres on a substrate; and (iv) subjecting the resulting monochromal spheres to a vapor thermal deposition with a second colorant dissimilar than the first colorant to thereby coat one hemisphere of each of said monochromal spheres and resulting in bichromal spheres with dissimilar colors.

BACKGROUND OF THE INVENTION

This invention generally relates to displays, and the preparation, or fabrication of a display devices, and more specifically to robust and reflective flexible display devices, and sheets thereof comprised of small spheres encapsulated with a wax, for example, wherein small is for example, from about 2 to about 150 microns in volume average diameter as measured by the Coulter Counter, and more specifically wherein the wax encapsulated sphere is comprised of a bichromal sphere encapsulated within a hydrocarbon wax, and wherein the wax encapsulated spheres are dispersed in an elastomer or plastic membrane with a plastic conductive coating such as indium tin oxide.

The displays are useful in generating images, which can be stored or erased and more specifically the display devices or devices function by rotating a bichromal sphere by an external field to create the image.

PRIOR ART

Electric Paper or twisted ball panel display devices are known and are described, for example, in U.S. Pat. Nos. 4,126,854; 4,143,103; 4,261,653; 4,438,160; 5,389,945, the disclosures of each of which are totally incorporated herein by reference, and wherein the devices are generally comprised of an elastomer, such as a cured polysiloxane, sandwiched between two ITO coated substrates, such as glass or MYLAR®, and wherein the elastomer layer has closely packed cavities containing a bichromal sphere suspended in a dielectric liquid. The image is formed by the application of an electric field, which rotates the bichromal sphere differentiated by the different static properties induced by the pigment contained in the sphere and resulting in contrasting zeta potentials of the two colored hemispheres of the sphere. It is the difference in zeta potentials between the hemispheres of the ball which causes the ball to act like a dipole in the presence of an electrical field, causing the ball to rotate, until its dipole vector lines up with the direction of the electrical field established between opposed electrodes. In addition to the dipole charge distribution found on the bichromal ball in the presence of an electric field, there is also a monopole charge which is the net electrical charge of the entire ball. As a result of the monopole charge, the ball is caused to move in the direction of the electrical field and will rest and be retained against a cavity wall. In order for the ball to rotate easily in the liquid within the cavity, due to the dipole charge, it is moved from contact with the cavity wall. When at rest against the cavity wall, friction and other forces will prevent it from rotating until it has been moved away again, due to the monopole charge. It is this feature which primarily enables long term, that is indefinite image retention in the display device if undisturbed or not handled by force. However, the aforementioned electric paper devices are not believed to be robust and suffer with respect to image retention when handled. More specifically, the image formed on the above prior art displays can deteriorate by touching it, especially if the user has built up a static charge, by rubbing over the image, dropping the display device on a surface or by carrying it. This loss in image retention is caused by the insufficient lack of adhesion of the bichromal sphere onto the elastomer, and wherein the spheres detachment from the cavity surface suspends the bichromal sphere in a low viscosity medium thus allowing the sphere to rotate uncontrollably within the liquid cavity. The robust flexible display device of the present invention, possesses minimum, or substantially no image deterioration when handled by the user. More specifically, the display device of the present invention contains a solid wax encapsulating the bichromal sphere, hence not allowing for the sphere to move or minimizing movement within the cavity.

The fabrication of certain bichromal spheres is known, for example, the above mentioned U.S. Pat. No. 4,143,103, and wherein the sphere is comprised of black polyethylene. with a light reflective material, for example, titanium oxide, sputtered on hemisphere. Also in U.S. Pat. No. 4,438,160, the disclosures of which is totally incorporated herein by reference, a rotary ball is prepared by coating white glass balls of about 50 microns in diameter, with an inorganic coloring layer such as $MgF_2$ or $Sb_2S_3$ by evaporation. In a similar process, there is disclosed in are article entitled "The Gyricon—A twisting Ball Display", published in the proceedings of the S.I.D., Vol. 18/3 and 4 (1977), a method for fabricating bichromal balls by first heavily loading chromatic glass balls with a white pigment such as titanium oxide, followed by coating from one direction in a vacuum evaporation chamber with a dense layer of nonconductive black material which coats only one hemisphere.

Also in U.S. Pat. No. 4,810,431 by Leidner, there is disclosed a process for generating spherical particles by (a) coextruding a fiber of a semi-circular layer of a polyethylene pigmented white and a black layer of polyethylene containing magnetite, (b) chopping the resultant fiber into fine particles ranging from 10 microns to about 10 millimeters, (c) mixing the particles with clay or anti-agglomeration materials, and (d) heating the mixture with a liquid at about 120° C. to spherodize the particles, followed by cooling to allow for solidification.

There is also disclosed in U.S. Pat. No. 5,262,809, an apparatus for fabricating hemispherical bichromal balls, comprising a separator member having opposing first and second surfaces and an edge region in contact with both surfaces, and delivery means for flowing first and second colored hardenable liquid material over the first and second surfaces, respectively, so that the liquid materials arrive at the edge at substantially the same flow rate and form a reservoir outboard of the edge region. The reservoir comprises side-by-side regions of different colors which do not intermix. Further means is provided for propelling the first and second liquid materials away from the separator member and out of the reservoir into a fluid medium as a plurality of side-by-side bichromal streams whose forward ends become unstable and break up into droplets which form into spherical balls, each of the balls comprising hemispheres of differently colored hardenable liquids. These bichromal balls are from about 5 to 200 microns in diameter.

There is a need for a robust and reflective flexible display device which is reimageable multiple times, such as from about 10 to about 10,000 times and preferably from about 100 to about 10,000 times, which displays high reflectivity, such as from about 15 to about 100 percent or preferably from about 20 to about 50 percent, which displays high contrast ratios such as from about 3 to about 6, and is robust such that the device can be handled like paper without image deterioration or image loss.

SUMMARY OF THE INVENTION

It is a feature of the present invention to provide a method for the preparation of robust and flexible electric papers, gyricon or twisting Ball display devices.

In another feature of the present invention there is provided a process for the fabrication of wax encapsulated bichromal spheres.

In yet another feature of the present invention there are provided processes for the preparation of a robust device comprised of wax encapsulated bichromal spheres, with one hemisphere displaying a white color, and the other hemisphere displaying a black color, and wherein each of the bichromal spheres is each of from about 2 to about 50 microns in diameter, and preferably of from about 5 to about 25 microns in diameter, and which spheres are for example, dispersed in an elastomer or plastic coated with a conductive coating like indium tin oxide.

Moreover, it is a feature of the present invention to provide processes for the preparation of wax encapsulated bichromal spheres by coacervation involving the precipitation of wax onto the surface of each bichromal sphere.

In yet another feature of the present invention there is provided a process for uniformly coating bichromal spheres with a wax component.

A further feature of the present invention is to provide a robust flexible display device with high reflectivity, such as from about 15 to about 100 percent, and preferably higher than 18 percent, for example from about 20 to about 75 percent.

Moreover, a further feature of the present invention is to provide a robust flexible display device with high contrast ratio, such as from about 3 to about 9.

Additionally, a further feature of the present invention is to provide a robust flexible display device which can be handled like paper without image deterioration or loss.

The bichromal spheres of the present invention which are comprised for example, of hemispheres of contrasting, or different color and dissimilar zeta potentials are useful as a flexible "electric paper" display device. The present invention is generally directed to a robust electric paper display device, or a rotary twisted ball or a Gyricon display device, comprised of bichromal sphere such as from about 45 to about 65, and more specifically from about 45 to about 55 percent by weight of the device, in which one hemispherical, that is about one half, or about 50 percent, surface of the sphere ball is colored a first color, like white and the other hemisphere is of a second dissimilar color, that is for example, a color other than white, such as black, reference for example U.S. Pat. No. 4,126,854, the disclosure of which is totally incorporated herein by reference. The wax encapsulant is for example a low melting hydrocarbon wax, for example with a melting point of from about 10 degrees Centigrade to about 80, and more specifically from about 25 to about 65 degrees Centigrade, and wherein the carbon chain length or carbon content of the wax is from about 18 to about 1,000, and more specifically from about 100 to about 500 carbon atoms. The flexible display device, when heated to a temperature above the melting point of the wax, and under the action of an external electric field, allows the bichromal spheres to rotate in accordance with their electrical anisotropy to provide an image. Cooling the device to a temperature at or below about the melting point of the wax, freezes or immobilizes the image.

The present invention is also directed to a method for the preparation of display devices and methods for fabricating the wax encapsulated bichromal spheres, and wherein each of the spheres are of small size, such as from about 2 to about 150 microns in diameter and preferably from about 10 to about 50 microns in diameter, volume average throughout, and wherein the method comprises (a) solubilizing a wax in an organic solvent; (b) suspending bichromal spheres in the organic solvent; (c) adding thereto a second solvent which precipitates or coacervates the wax onto each of the bichromal spheres; and (d) optionally, but preferably isolating the wax encapsulated spheres.

The bichromal spheres are also preferably fabricated by the processes as disclosed in U.S. Pat. No. 5,989,629, the disclosure of which are totally incorporated herein by reference, or as disclosed in U.S. Pat. No. 4,126,854, the disclosure of which are totally incorporated herein by reference. Alternatively, other known methods for the preparation of bichromal spheres can be practiced such as disclosed in U.S. Pat. No. 5,262,809, the disclosure of which is totally incorporated herein by reference.

With the present invention, there is provided a robust flexible display device, and wherein the device is comprised of wax encapsulated bichromal spheres dispersed in an elastomer or transparent plastic device with a plastic conductive coating. An image can be formed by heating the display device, or display sheet in for example, an ionographic apparatus, to a temperature of about 10 to about 20 degrees Centigrade above the melting point of the wax, causing the wax to melt into a low viscosity liquid, such as a viscosity of from about 1 to about 100 centipoise, followed by forming an image with an external electric field or ion deposited on the display device and casing the bichromal spheres to rotate in the liquid wax cavity, and followed by removing the image from the heated device and allowing the wax to solidify on cooling to about the melting point of the wax or lower and freezing or immobilizing the bichromal sphere to result in a robust flexible device.

The wax encapsulated spheres can be prepared by coating the bichromal spheres with wax as practiced in the art of coacervation. In an embodiment of the present invention, the wax encapsulated spheres are prepared by a precipitation technique, for example, by suspending the bichromal spheres in an organic solvent containing a dissolved wax component, followed by adding thereto a solvent within which the wax component is insoluble, or substantially insoluble thereby causing it to precipitate from solution, and wherein, the wax precipitates and coats onto the bichromal spheres thereby encapsulating it.

The process of the present invention in embodiments comprises the encapsulation of bichromal spheres with wax components, followed by dispersing the wax encapsulated bichromal spheres in an elastomer or plastic device situated on a substrate, such as MYLAR® coated with indium tin oxide. For example, about 20 to about 25 grams of 70 micron bichromal spheres prepared as disclosed in U.S. Pat. No. 5,262,809, the disclosure of which is totally incorporated herein by reference, is suspended in about 150 to about 200 grams of tetrahydrofuran containing 15 to about 20 grams of Petrolite X-6040 wax (mp=35° C.). To this stirred mixture is then added about 100 to about 150 grams of methanol dropwise over a 1 hour period, causing the wax to precipitate and coat the bichromal spheres. The product is then filtered through a 50 micron screen to result in about 50 to about 55 grams of wax encapsulated bichromal sphere.

Illustrative examples of wax components that can be utilized for encapsulating the bichromal spheres are known, for example linear and branched hydrocarbons of from about 18 to about 1,000, and more specifically from about 25 to about 100 carbon atoms, and with a melting point temperature of from about 15° C. to about 80° C., and preferably from about 25° C. to about 60° C., with the understanding that waxes that melt below room temperature are to be used in colder environments where such waxes are solid, and with molecular weights of from about 300 grams per mole to about 10,000 grams per more as measured by Gel Permeation Chromatography preferably. Examples of commercial waxes are the Petrolite X-series wax, or bees wax. Other useful encapsulates are low melting hydrocarbons such as NORPAR, Illustrative examples of organic solvents that can be utilized for dissolving the wax component include nonpolar solvents such as hexanes, heptanes, octanes, Isopar, Magisol, ether, tetrahydrofuran, toluene, xylene, ethyl acetate, benzene, naphtha and the like. Generally organic aromatic solvents and aliphatic solvents can be selected. illustrative examples of solvents that can be utilized for precipitating or coacervating the wax onto the surface of the bichromal spheres include any solvent for this purpose, such as water, acetone, and aliphatic alcohols, with for example, from about 1 to about 25 carbon atoms, such as methanol, ethanol, propanol, and butanol.

Illustrative examples of the first substrate utilized for forming the devices are an epoxy resin, an elastomer such as polydimethyl siloxane, elastomers such as SYLGARD 184 available from Dow Corning, a polyurethane, a polyurea, a polyester, and the like. Examples of the second and third substrate are glass, a polyester such as MYLAR®, a polyurethane, a polystyrene resin, or a polystyrene-(meth)-acrylate resin with a conductive layer thereon such as an indium tin oxide coating, and wherein the thickness of each of the first, second, and third substrates are from about 20 to about 1,000 microns and preferably from about 30 to about 500 micron, and the thickness of the conductive coating is from about 0.5 micron to about 20 micron.

Aspects of the present invention relate to a display comprised of a first component containing spheres encapsulated within a wax, and thereover and thereunder the first component substrates;

a display device comprised of a first substrate containing an array of bichromal spheres encapsulated with a wax, and wherein the first substrate is situated between a second substrate and a third substrate;

a display device wherein the first substrate is an elastomer or a plastic;

a display device wherein the second substrate is an indium tin oxide coated glass or a polyester of polyethylene-terephthalate;

a display wherein the second substrate is indium tin oxide;

a display device wherein the bichromal sphere is from about 5 to about 25 microns in diameter, and is comprised of one hemisphere colored white, and the remaining hemisphere coated with a color other than white;

a display wherein the color other then white is black, blue, red, yellow, cyan, green, magenta, orange, or mixtures thereof;

a display device wherein the bichromal sphere is encapsulated in a wax comprised of a hydrocarbon;

a display device wherein the wax is a transparent linear hydrocarbon or a branched hydrocarbon each with from about 18 to about 1,000 carbon atoms;

a display device wherein the first substrate is an elastomer of polydimethylsiloxane or a polyurethane;

a display device wherein the first substrate is a plastic of an epoxy resin, a polyester resin, a polyamide resin, a polystyrene-(meth)-acrylate resin, a polydimethylsiloxane, or a polyurethane;

a display device wherein the second and third substrate is a conductive glass;

a display device wherein the second substrate is a conductive plastic of a polyester resin coated with indium tin oxide;

a process for the preparation of wax encapsulated bichromal spheres comprising (a) solubilizing a wax in an organic solvent; (b) suspending bichromal spheres in the organic solvent; (c) adding thereto a second solvent which precipitates or coacervates the wax onto each of the bichromal spheres; and (d) optionally isolating the wax encapsulated spheres;

a process wherein the wax is a linear or branched hydrocarbon with about 18 to about 1,000 carbon atoms;

a process wherein the wax has a melting point of from about 15 degrees Centigrade to about 80 degrees Centigrade;

a process wherein the organic solvent is hexane, heptane, octane, nonane, decane, dodecane, Isopar, tetrahydrofuran, diethyl ether, chloroform, methylene chloride, ethyl acetate, benzene, chlorobenzene, toluene, n-methylpyrrolidinone, dimethyl sulfoxide, dimethyl formamide or xylene;

a process wherein the second solvent is water, methanol, ethanol, propanol, butanol, or acetone;

a display device comprised of a first substrate with a thickness of from about 20 to about 100 microns, containing wax encapsulated bichromal spheres of from about 45 to about 85 percent by weight of the substrate, wherein the first substrate is situated between a second and third substrate;

a display device comprised of a first substrate comprised of a resin or elastomer and dispersed therein an array of bichromal spheres encapsulated with a wax, and wherein the first substrate with said spheres has a thickness of from about 20 to about 100 microns, and is sandwiched between a second and third substrate comprised of a conductive glass or plastic device each with a thickness of from about 10 to about 500 microns in diameter;

a device wherein said second and said third substrate are comprised of a conductive glass or plastic device;

a process wherein the organic solvent is hexane, heptane, octane, nonane, decane, dodecane, Isopar, tetrahydrofuran, diethyl ether, chloroform, methylene chloride, ethyl acetate, benzene, chlorobenzene, toluene, n-methylpyrrolidinone, dimethyl sulfoxide, dimethyl formamide or xylene, and which solvent is selected in an amount of from about 5 to about 40 percent by weight of the bichromal spheres; and a process wherein the second solvent is water, methanol, ethanol, propanol, butanol, or acetone, and which solvent is selected in an amount of from about 5 to about 40 percent by weight of the bichromal spheres.

The following EXAMPLES are provided:

EXAMPLE 1

Preparation of a robust and reflective display device comprised of 70 volume average micron bichromal spheres encapsulated within 25% by weight of hydrocarbon wax (Petrolite X-6040), dispersed in a siloxane elastomer and sandwiched between two indium tin oxide-(ITO) coated glass or MYLAR® substrates was accomplished as follows:

Step 1. Preparation of 70 Micron Bichromal Spheres Encapsulated with 25% by Weight of Wax (Petrolite X-6040):

A 1 liter beaker equipped with a mechanical stirrer was charged with 220 grams of tetrahydrofuran solvent, 75 grams of 70 micron black and white colored bichromal spheres (prepared as disclosed in U.S. Pat. No. 5,262,809, the disclosure of which is totally incorporated herein by reference ) and 18.75 grams of Petrolite X-6040 wax (mp=35° C.). To this stirred mixture was then added about 125 grams of methanol dropwise over a 3 hour period, causing the wax to precipitate and fully coat each of the bichromal spheres. The product was then filtered through a 50 micron screen to result in about 85 grams of wax encapsulated black and white colored bichromal spheres.

Step 2. Preparation of the Display Device

A display device was fabricated from the above prepared spheres by (1) mixing 50 grams of the prepared bichromal spheres with 50 grams of SYLGARD® 185 silicone elastomer Kit available from Dow Corning; (2) forming a device by spreading the resulting mixture on a glass plate surface and which spreading was with a metering bar such as an 8-Path Wet Film Applicator (available from P. Gardner Company) with a gap of from about 20 microns to about 500 microns, and crosslinking the SYLGARD elastomer device by heating to a temperature of from about 80° C. to about 100° C. for a duration of from about 3 to about 24 hours; and then (3) sealing the device between addressing plates of indium tin oxide coated glass or preferably MYLAR®, each with a thickness of from about 20 to about 500 microns.

EXAMPLE 2

Preparation of a robust and reflective display device comprised of 70 micron Bichromal spheres encapsulated within 20% by weight of hydrocarbon wax (Petrolite X-6040), dispersed in a siloxane elastomer and sandwiched between two MYLAR® substrates was accomplished as follows Step 1. Preparation of 70 Micron Bichromal Spheres Encapsulated with 20 Percent by Weight of Wax (Petrolite X-6040)

A 1 liter beaker equipped with a mechanical stirrer was charged with 220 grams of tetrahydrofuran solvent, 75 grams of 70 micron black and white colored bichromal spheres (prepared as disclosed in U.S. Pat. No. 5,262,809) and 15 grams of Petrolite X-6040 wax (mp=35° C.). To this stirred mixture was then added about 125 grams of methanol dropwise over a 3 hour period, causing the wax to precipitate and fully coat the bichromal spheres. The product was then filtered through a 50 micron screen to result in about 83 grams of wax encapsulated bichromal spheres.

Step 2. Preparation of the Display Device

A display device was fabricated from the above bichromal spheres by (1) mixing 50 grams of the prepared bichromal spheres with 50 grams of SYLGARD® 185 silicone elastomer Kit available from Dow Corning; (2) forming a device by spreading the mixture on a glass plate surface and which spreading was with a metering bar such as an 8-Path Wet Film Applicator (available from P. Gardner Company) with a gap of from about 20 microns to about 500 microns, and crosslinking the SYLGARD elastomer device by heating to a temperature of from about 80° C. to about 100° C. for a duration of from about 3 to about 24 hours; and (3) then sealing the device between addressing plates of indium tin oxide, coated glass or MYLAR®, each with a thickness of from about 20 to about 500 microns.

EXAMPLE 3

Preparation of a robust and reflective display device comprised of 70 micron Bichromal spheres encapsulated within 25% by weight of hydrocarbon wax (Petrolite ), dispersed in a siloxane elastomer and sandwiched between two substrates was accomplished as follows Step 1. Preparation of 70 Micron Bichromal Spheres Encapsulated with 25% by Weight of Wax (Petrolite X-6028)

A 1 liter beaker equipped with a mechanical stirrer was charged with 220 grams of tetrahydrofuran solvent, 25 grams of 70 micron of black and white colored bichromal spheres (prepared as disclosed in U.S. Pat. No. 5,262,809) and 18 grams of Petrolite(X-6028) wax (mp=41° C.). To this stirred mixture was then added about 125 grams of methanol dropwise over a 3 hour period, causing the wax to precipitate and fully coat each of the bichromal spheres. The product was then filtered through a 50 micron screen to result in about 85 grams of wax encapsulated bichromal spheres.

Step 2. Preparation of the Display Devices

A display device was fabricated from the above bichromal sphere by (1) mixing 50 grams of the prepared bichromal spheres with 50 grams of SYLGARD® 185 silicone elastomer Kit available from Dow Corning; (2) forming a device by spreading the mixture on a glass plate surface and which spreading was with a metering bar such as an 8-Path Wet Film Applicator (available from P. Gardner Company) with a gap of from about 20 microns to about 500 microns, and crosslinking the SYLGARD elastomer device by heating to a temperature of from about 80° C. to about 100° C. for a duration of from about 3 to about 24 hours; and (3) then sealing device between addressing plates of Indium tin oxide coated glass or MYLAR®, each with a thickness of from about 20 to about 500 microns.

Other modifications of the present invention may occur to one of ordinary skill in the art subsequent to a review of the present application, and these modifications, including equivalents, or substantial equivalents thereof, are intended to be included within the scope of the present invention.

What is claimed is:

1. A display device comprised of a first component containing spheres encapsulated within a solid wax, and thereover and thereunder said component a substrate.

2. A display device in accordance with claim 1, wherein the spheres are encapsulated in a wax comprised of a hydrocarbon.

3. A display device in accordance with claim 1 wherein said wax is a hydrocarbon wax, and wherein the hydrocarbon contains a carbon chain length of from about 100 to about 500 carbon atoms.

4. A display device in accordance with claim 3 wherein said wax possesses a melting point of from about 15° C. to about 80° C.

5. A display device in accordance with claim 3 wherein the melting point of said wax is from about 25° C. to about 65° C.

6. A display consisting essentially of a first component containing spheres encapsulated within a wax and thereover and thereunder said component a substrate, and wherein said wax is a hydrocarbon with from about 18 to about 1,000 carbon atoms, and wherein said hydrocarbon possesses a melting point temperature of from about 15° C. to about 80° C.

7. A display device comprised of a first substrate containing bichromal spheres encapsulated with a solid wax, and wherein said first substrate is situated between a second substrate and a third substrate.

8. A display device in accordance with claim 7, wherein the first substrate is elastomer or plastic.

9. A display device in accordance with claim 8, wherein said second substrate is indium tin oxide.

10. A display device in accordance with claim 7, wherein the second substrate is an indium tin oxide coated glass or a polyester of polyethylene-terephthalate.

11. A display device in accordance with claim 7, wherein the bichromal sphere is from about 5 to about 25 microns in diameter, and is comprised of one hemisphere colored white, and the remaining hemisphere coated with a color other than white.

12. A display device in accordance with claim 11, wherein said color other than white is black, blue, red, yellow, cyan, green, magenta, orange, or mixtures thereof.

13. A display device in accordance with claim 7, wherein the wax is a transparent linear hydrocarbon or a branched hydrocarbon each with from about 18 to about 1,000 carbon atoms.

14. A display device in accordance with claim 7, wherein the first substrate is an elastomer of polydimethylsiloxane or a polyurethane.

15. A display device in accordance with claim 7, wherein the first substrate is a plastic of an epoxy resin, a polyester resin, a polyamide resin, a polystyrene-(meth)-acrylate resin, a polydimethylsiloxane, or a polyurethane.

16. A display device in accordance with claim 7, wherein the second and third substrate is a conductive glass.

17. A display device in accordance with claim 7, wherein the second substrate is a conductive plastic of a polyester resin coated with indium tin oxide.

18. A display device comprised of a first substrate with a thickness of from about 20 to about 100 microns, containing solid wax encapsulated bichromal spheres of from about 45 to about 85 percent by weight of said substrate, and wherein said first substrate is situated between a second and third substrate.

19. A display device in accordance with claim 18, wherein the second substrate is a conductive glass or plastic device.

20. A display device in accordance with claim 18, wherein the wax is a transparent linear hydrocarbon or a branched hydrocarbon each with from about 18 to about 500 carbon atoms.

21. A display device in accordance with claim 20, wherein said second and said third substrate are comprised of a conductive glass or a plastic.

22. A display device comprised of a first substrate comprised of a resin or elastomer and dispersed therein an array of bichromal spheres encapsulated with a wax, and wherein said first substrate with said spheres has a thickness of from about 20 to about 100 microns, and is sandwiched between a second and third substrate each comprised of a conductive glass or plastic device each with a thickness of from about 10 to about 500 microns.

23. A display device comprised of a first component containing spheres encapsulated within a wax and thereover and thereunder said component a substrate, and wherein said wax is a hydrocarbon with from about 18 to about 1,000 carbon atoms, and wherein said hydrocarbon possesses a melting point temperature of from about 15° C. to about 80° C.

24. A display device in accordance with claim 23 wherein said hydrocarbon contains from about 25 to about 100 carbon atoms.

25. A display device in accordance with claim 23 wherein said hydrocarbon possesses a melting point temperature of from about 25° C. to about 60° C.

26. A display device in accordance with claim 23 wherein said hydrocarbon possesses a molecular weight of from about 300 grams per mole to about 10,000 grams per mole.

* * * * *